United States Patent
Okuda

(10) Patent No.: US 9,550,904 B2
(45) Date of Patent: Jan. 24, 2017

(54) RECORDING METHOD, RECORDING APPARATUS, AND INK SET

(71) Applicant: Seiko Epson Corporation, Tokyo (JP)

(72) Inventor: Ippei Okuda, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/858,263

(22) Filed: Sep. 18, 2015

(65) Prior Publication Data

US 2016/0083603 A1 Mar. 24, 2016

(30) Foreign Application Priority Data

Sep. 19, 2014 (JP) ................. 2014-191884

(51) Int. Cl.
*B41J 2/21* (2006.01)
*C09D 11/54* (2014.01)
*B41M 5/00* (2006.01)
*B41M 7/00* (2006.01)

(52) U.S. Cl.
CPC .............. *C09D 11/54* (2013.01); *B41J 2/2114* (2013.01); *B41M 5/0017* (2013.01); *B41M 7/0018* (2013.01)

(58) Field of Classification Search
CPC ................................. B41J 2/2103; B41J 2/2114
See application file for complete search history.

(56) References Cited

U.S. PATENT DOCUMENTS

| | | | |
|---|---|---|---|
| 2011/0293898 A1* | 12/2011 | Yatake | C09D 11/40 428/195.1 |
| 2012/0206534 A1* | 8/2012 | Fassam | B41J 11/002 347/20 |
| 2013/0250016 A1* | 9/2013 | Shinohara | C09D 11/30 347/100 |

FOREIGN PATENT DOCUMENTS

JP 2012-040750 A 3/2012

* cited by examiner

*Primary Examiner* — Jason Uhlenhake
(74) *Attorney, Agent, or Firm* — Nutter McClennen & Fish LLP; John J. Penny, Jr.; Alex Nagomiy

(57) ABSTRACT

Disclosed is a recording method including recording which includes attaching a color ink composition, which contains a coloring material, and a reaction solution, which includes an aggregating agent which aggregates components of the color ink composition, to a recording medium in no particular order, in which the color ink composition gives recorded matter with a glossiness at 60° of 60 to 100 when the color ink composition is individually attached to a recording medium with a glossiness at 60° of 80 to 100.

17 Claims, 1 Drawing Sheet

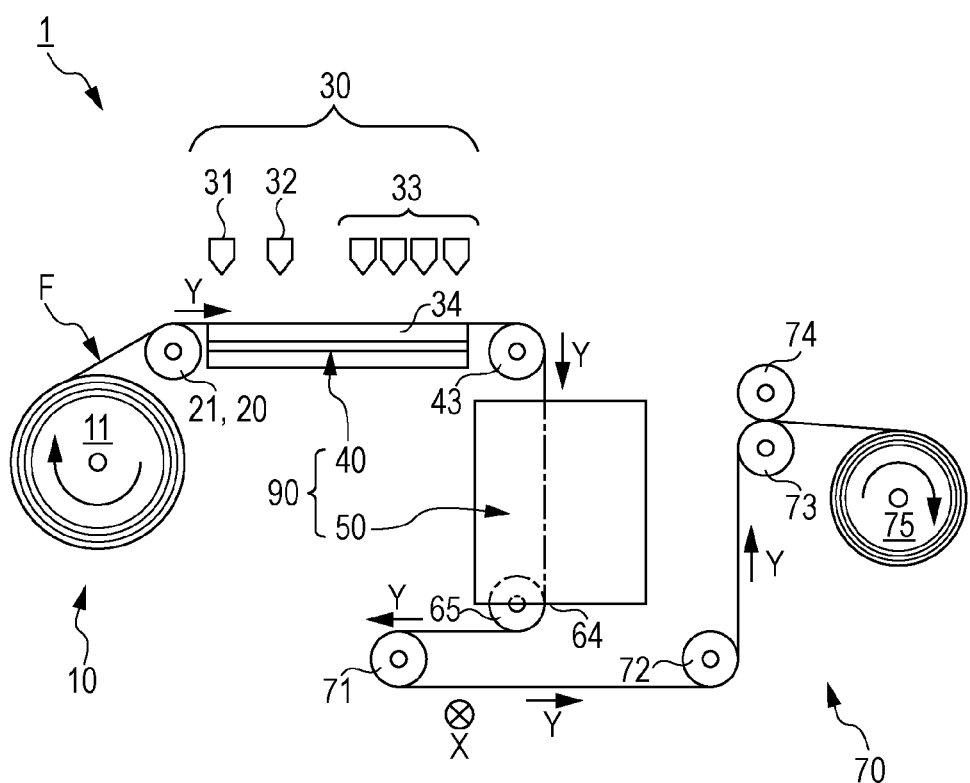

RECORDING METHOD, RECORDING APPARATUS, AND INK SET

BACKGROUND

1. Technical Field

The present invention relates to a recording method, a recording apparatus, and an ink set.

2. Related Art

Ink jet recording methods are able to record high definition images using a comparatively simple apparatus and have undergone rapid developments in various aspects. Among these, various studies have been carried out on the image quality and the like of the obtained recorded matter. For example, JP-A-2012-040750 discloses an image forming method which records a black image by ink jet recording by combining each of black, cyan, magenta, and yellow inks formed of an aqueous dispersion of polymer fine particles which contains at least water, a water-soluble organic solvent, a surfactant, and a pigment, and which carries out printing by combining each of the inks after adding a pre-treatment liquid which includes at least water, a water-soluble resin, and colloidal silica to the entirety of a recording medium with an object of providing an image forming method which is able to realize improved glossiness for black images, high image densities, and improved fixing properties, and to reduce feathering or color bleeding.

However, in the method described in JP-A-2012-040750, although it is possible to maintain the optical density of recorded matter in a case of using plain paper as a recording medium, there is a problem in that the optical density of the recorded matter will be inferior in a case of using coated paper, a film, or the like having glossiness as the recording medium.

SUMMARY

An advantage of some aspects of the invention is that it provides a recording method, a recording apparatus, and an ink set with which it is possible to obtain recorded matter which has a stable optical density (OD value) regardless of the properties of a recording medium.

The present inventors carried out intensive research in order to solve the problem described above. As a result, the invention was completed by discovering that it is possible to solve the problem described above by carrying out predetermined processes.

That is, the invention is as follows.

(1) A recording method includes: recording which includes attaching a color ink composition which contains a coloring material to a recording medium and attaching a reaction solution which includes an aggregating agent which aggregates components of the color ink composition, wherein the color ink composition gives recorded matter with a glossiness at 60° of 60 to 100 when the color ink composition is individually attached to the recording medium with a glossiness at 60° of 80 to 100.

(2) The recording method according to (1), wherein, using a recording apparatus which is able to perform first recording which performs recording on a recording medium with a glossiness at 60° of less than 10 and second recording which performs recording on a recording medium with a glossiness at 60° of 10 or more, the recording selects at least one recording, and performs the selected recording.

(3) The recording method according to (1) or (2), wherein, when attaching the color ink composition individually to the recording medium with a glossiness of 80 to 100 at 60°, the color ink composition gives recorded matter with a glossiness at 60° of 75 to 100.

(4) The recording method according to (2) or (3), wherein recording is performed on a recording medium with a glossiness at 60° of 50 or more in the second recording.

(5) The recording method according to any one of (1) to (4), wherein the color ink composition contains 0.50 mass % to 7.0 mass % of a pigment and 0.05 mass % to 10 mass % of resin fine particles.

(6) The recording method according to any one of (1) to (5), wherein the color ink composition is a black ink composition which contains a black pigment.

(7) The recording method according to any one of (2) to (6), wherein the recording medium with a glossiness at 60° of less than 10 is an absorptive recording medium, and the recording medium with a glossiness at 60° of 10 or more is a low-absorptive recording medium or non-absorptive recording medium.

(8) The recording method according any one of (1) to (7), wherein the aggregating agent includes at least one of a multivalent metal salt and an organic acid.

(9) The recording method according to any one of (1) to (8), wherein an average particle diameter of the color ink composition according to a dynamic light scattering method is 80 nm or more.

(10) A recording apparatus which performs recording using the recording method according to any one of (1) to (9).

(11) An ink set includes: a color ink composition which contains a coloring material; and a reaction solution which includes an aggregating agent which aggregates components of the color ink composition, wherein the color ink composition gives recorded matter with a glossiness at 60° of 60 to 100 when the color ink composition is individually attached to the recording medium with a glossiness at 60° of 80 to 100.

BRIEF DESCRIPTION OF THE DRAWING

The invention will be described with reference to the accompanying drawings, wherein like numbers reference like elements.

FIGURE is a side surface diagram which shows a schematic of the entirety of an example of an ink jet recording apparatus which may be used for the present embodiment.

DESCRIPTION OF EXEMPLARY EMBODIMENTS

Detailed description will be given below of an embodiment of the invention (referred to below as the "present embodiment") with reference to the diagram as necessary; however, the invention is not limited thereto and various types of modifications are possible within a range which does not depart from the gist of the invention. Here, in the diagram, the same reference numerals are given to the same elements and overlapping description thereof will be omitted. In addition, unless otherwise stated, positional relationships such as top, bottom, left, and right are based on the positional relationships shown in the diagram. Furthermore, the dimension ratios in the diagram are not limited to the ratios shown in the diagram.

Recording Method

A recording method of the present embodiment includes recording which includes attaching a color ink composition which contains a coloring material to a recording medium, and attaching a reaction solution which includes an aggregating agent which aggregates components of the color ink composition, in which the color ink composition gives recorded matter with a glossiness at 60° of 60 to 100 when the color ink composition is individually attached to a recording medium with a glossiness at 60° of 80 to 100.

In order to suppress bleeding of the ink composition, it is preferable to use a reaction solution which includes an aggregating agent which reacts with the ink composition. However, when using a reaction solution, the glossiness of the coated film of ink has a tendency to deteriorate and the OD value also decreases for this reason. The OD value has a tendency to increase and decrease along with the glossiness since the OD value is measured using reflected light; however, when the OD value decreases, visually, the color development also deteriorates.

The tendency is also affected by the properties of the recording medium. That is, the color development deteriorates more easily in an absorptive recording medium since the ink composition easily permeates the medium, and, with a low-absorptive recording medium or non-absorptive recording medium, the glossiness deteriorates more and the recorded matter easily becomes matte.

With respect to these problems, it is also possible to consider using various types of ink compositions according to the recording medium; however, when considering limitations on the recording apparatus and the like, there is a demand to avoid increasing the number of the ink compositions as much as possible. That is, there is a demand to be able to stably obtain a desired image with one type of an ink composition regardless of the properties of the recording medium.

With respect to this, it is possible to stably obtain a desired image regardless of the properties of the recording medium by having the configuration described above in the recording method of the present embodiment. That is, recorded matter which has sharp and crisp color development is obtained with an absorptive recording medium and recorded matter for which the glossiness is not deteriorated is obtained with a low-absorptive recording medium or non-absorptive recording medium.

Recording

The recording includes attaching a color ink composition which contains a coloring material to a recording medium, and attaching a reaction solution which includes an aggregating agent which aggregates components of the color ink composition. It is possible to carry out these steps in a random order. In the recording, the reaction solution may be attached after attaching the color ink composition with respect to the recording medium, the color ink composition may be attached after attaching the reaction solution, or both may be attached at the same time. The color ink composition and the reaction solution react on the recording medium and the components of the color ink composition aggregate. Due to this, the OD value of the recorded matter is further improved. From this point, it is preferable to attach the color ink composition after attaching the reaction solution or to attach both at the same time, and it is more preferable to attach both at the same time.

The means for attaching the reaction solution is not particularly limited; however, it is possible to use, for example, roller coating, spray coating, and ink jet coating. Here, a step of drying at least a portion of the reaction solution which is coated on the recording medium may be further provided.

The attachment amount of the reaction solution is preferably 0.20 mg/inch$^2$ or more, more preferably 0.30 mg/inch$^2$ or more, even more preferably 0.50 mg/inch$^2$ or more, even more preferably 0.70 mg/inch$^2$ or more, even more preferably 1.0 mg/inch$^2$ or more, and particularly preferably 1.5 mg/inch$^2$ or more. In addition, the attachment amount of the reaction solution is preferably 2.0 mg/inch$^2$ or less, and more preferably 1.8 mg/inch$^2$ or less. By the attachment amount of the reaction solution being 0.20 mg/inch$^2$ or more, there is a tendency for the bleeding resistance to be further improved. In addition, by the attachment amount of the reaction solution being 2.0 mg/inch$^2$ or less, there is a tendency for the color development and the glossiness of the obtained recorded matter to be further improved.

In addition, the means for attaching the color ink composition is not particularly limited; however, it is possible to use, for example, an ink jet system. Here, a step of drying at least a portion of the color ink composition which is coated on the recording medium may be further provided.

The maximum attachment amount of the color ink composition is preferably 1.0 mg/inch$^2$ to 10 mg/inch$^2$, more preferably 3.0 mg/inch$^2$ to 9.0 mg/inch$^2$, even more preferably 5.0 mg/inch$^2$ to 8.0 mg/inch$^2$. By the maximum attachment amount of the color ink composition being within the range described above, there is a tendency for the bleeding resistance of the obtained recorded matter to be superior and for stickiness to be further suppressed. The "maximum attachment amount" refers to an attachment amount in a region in which the attachment amount of the color ink per unit area is the greatest in a region in which the color ink of the recording medium is attached.

It is possible to further attach a clear ink composition in the recording. The "clear ink composition" is not an ink which is used for coloring the recording medium, but an ink composition which is used for other purposes. The other purposes include adjustment of the glossiness of the recording medium, improvement of characteristics such as the scratch resistance of the recorded matter, improvement of the fixing property and color development of color inks, and the like. The clear ink is an ink composition where the content of the coloring material is preferably 0.1 mass % or less and, more preferably, which does not include a coloring material.

In addition, the means for attaching the clear ink composition is not particularly limited; however, it is possible to use, for example, an ink jet system. Here, a step of drying at least a portion of the clear ink composition which is coated on the recording medium may be further provided.

The maximum attachment amount of the clear ink composition is preferably 1.0 mg/inch$^2$ to 7.0 mg/inch$^2$, more preferably 1.0 mg/inch$^2$ to 5.0 mg/inch$^2$, and even more preferably 1.0 mg/inch$^2$ to 3.0 mg/inch$^2$. By the maximum attachment amount of the clear ink composition being within the range described above, there is a tendency for the bleeding resistance of the obtained recorded matter to be superior and for stickiness to be further suppressed.

In the recording, by using a recording apparatus which is able to perform first recording which performs recording on a recording medium with a glossiness at 60° of less than 10 and second recording which performs recording on a recording medium with a glossiness at 60° of 10 or more, it is possible to select at least one recording, and perform the selected recording.

First Recording

The glossiness at 60° of the recording medium which is used in the first recording is preferably less than 10, more preferably 7 or less, and even more preferably 5 or less. In the first recording, the recorded matter which is obtained by performing recording on a recording medium with a glossiness at 60° of less than 10 has sharp and crisp color development.

The recording medium with a glossiness at 60° of less than 10 is not particularly limited; however, for example, an absorptive recording medium is preferable. By using the absorptive recording medium, there is a tendency for the color development of the obtained recorded matter to be further improved.

The absorptive recording medium is not particularly limited; however, examples thereof include plain paper such as electrophotographic paper with high ink permeability, and ink jet paper (ink jet specialty paper which is provided with an ink absorbing layer which is configured from silica particles or alumina particles, or an ink absorbing layer which is configured from hydrophilic polymers such as polyvinyl alcohol (PVA) or polyvinyl pyrrolidone (PVP)).

Second Recording

On the other hand, the glossiness at 60° of the recording medium which is used in the second recording is preferably 10 or more, more preferably 30 or more, even more preferably 50 or more, and particularly preferably 70 or more. In the second recording, the recorded matter which is obtained by performing recording on a recording medium with a glossiness at 60° of 10 or more has a comparatively high glossiness.

The recording medium with a glossiness at 60° of 10 or more is not particularly limited; however, for example, a low-absorptive recording medium or non-absorptive recording medium is preferable. By using the low-absorptive recording medium or non-absorptive recording medium, there is a tendency for the optical density of the obtained recorded matter to be further improved.

The low-absorptive recording medium is not particularly limited; however, examples thereof include coated paper which is provided with a coating layer for receiving an oil-based ink on the surface. The coated paper is not particularly limited; however, examples thereof include printing paper such as art paper, coated paper, and matte paper.

The non-absorptive recording medium is not particularly limited; however, examples thereof include films or plates of plastics such as polyvinyl chloride, polyethylene, polypropylene, polyethylene terephthalate (PET), polycarbonate, polystyrene, and polyurethane; plates of metals such as iron, silver, copper, and aluminum; metal plates which are manufactured by vapor depositing various types of these metals, films made of plastic, and plates of alloys such as stainless steel or brass; recording media in which films of plastics such as polyvinyl chloride, polyethylene, polypropylene, polyethylene terephthalate (PET), polycarbonate, polystyrene, and polyurethane are adhered to (coated on) a paper base material, and the like.

In this manner, the recording method of the present embodiment is excellent in that it is possible to obtain recorded matter which has a stable optical density (an OD value) regardless of the properties of the recording medium.

Reaction Solution

The reaction solution includes an aggregating agent which aggregates components of the color ink composition. The ink composition thickens or becomes insoluble due to the aggregating agent components in the reaction solution interacting with the ink composition. Due to this, it is possible to prevent landing interference and bleeding with regard to the ink composition which is attached thereafter, and it is possible to uniformly draw lines, fine images, and the like.

Aggregating Agent

The aggregating agent is not particularly limited; however, examples thereof include at least one of a multivalent metal salt and an organic acid. By using such an aggregating agent, there is a tendency for the OD value of the obtained recorded matter to be further improved.

Multivalent Metal Salt

The multivalent metal salt is not particularly limited; however, for example, a multivalent metal salt of an inorganic acid or a multivalent metal salt of an organic acid is preferable. The multivalent metal salt is not particularly limited; however, examples thereof include salts of alkali earth metals of the second group in the periodic table (for example, magnesium and calcium), transition metals of the third group in the periodic table (for example, lanthanum), earth metals from the thirteenth group in the periodic table (for example, aluminum), and lanthanides (for example, neodymium). As the salts of the multivalent metals, carboxylate salt (formic acid, acetic acid, benzoate, and the like), sulfate, nitrate, chloride, and thiocyanate are favorable. Among these, preferable examples include calcium salt or magnesium salt of carboxylic acid (formic acid, acetic acid, benzoate, and the like), calcium salt or magnesium salt of sulfuric acid, calcium salt or magnesium salt of nitric acid, calcium chloride, magnesium chloride, calcium salt or magnesium salt of thiocyanic acid. Here, the multivalent metal salt may be used as one type individually or may be used in a combination of two or more types.

Organic Acid

The organic acid is not particularly limited; however, examples thereof include phosphoric acid, oxalic acid, malonic acid, citric acid, or salts thereof. Among these, a monovalent, divalent, or higher valency carboxylic acid or a salt thereof is preferable. By including the carboxylic acid or the salt thereof, there is a tendency for the OD value of the obtained recorded matter to be further improved. Here, the organic acid or the salt thereof may be used as one type individually or may be used in a combination of two or more types.

The content of the aggregating agent is preferably 0.090 mol/1000 g to 0.91 mol/1000 g with respect to the total amount of the reaction solution, more preferably 0.10 mol/1000 g to 0.90 mol/1000 g, even more preferably 0.20 mol/1000 g to 0.90 mol/1000 g, even more preferably 0.30 mol/1000 g to 0.90 mol/1000 g, and even more preferably 0.50 mol/1000 g to 0.90 mol/1000 g. By the content being within the range described above, there is a tendency for the OD value of the obtained recorded matter to be further improved.

The reaction solution is able to include other components as necessary. The other components are not particularly limited; however, examples thereof include water, an organic solvent, a surfactant, and the like.

Water

Examples of the water include water from which ionic impurities are removed as much as possible such as pure water such as ion-exchanged water, ultrafiltration water, reverse osmosis water, and distilled water, and ultra-pure water. In addition, when using water which is sterilized by ultraviolet irradiation, addition of hydrogen peroxide, and the like, it is possible to prevent the generation of molds or bacteria in a case of storing the ink for long periods. Due to this, there is a tendency for the storage stability to be further improved.

The content of the water is preferably 50 mass % to 90 mass % with respect to the total amount of the reaction solution, more preferably 55 mass % to 85 mass %, and even more preferably 50 mass % to 80 mass %. By the content of water being within the range described above, it is possible to decrease the viscosity.

Organic Solvent

The organic solvent is not particularly limited; however, examples thereof include alcohols or glycols such as glycerine, ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-iso-propyl ether, diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, tripropylene glycol dimethyl ether, methanol, ethanol, n-propyl alcohol, iso-propyl alcohol, n-butanol, 2-butanol, tert-butanol, iso-butanol, n-pentanol, 2-pentanol, 3-pentanol, and tert-pentanol; N,N-dimethyl formamide, N,N-dimethyl acetamide, 2-pyrrolidone, N-methyl-2-pyrrolidone, 2-oxazolidone, 1,3-dimethyl-2-imidazolidinone, dimethyl sulfoxide, sulfolane, and 1,1,3,3-tetramethyl urea. Among these, a water-soluble organic solvent of 1,2-hexanediol, propylene glycol, and the like is preferable.

The content of the organic solvent is preferably 10 mass % to 30 mass % with respect to the total amount of the reaction solution, more preferably 12.5 mass % to 30 mass %, and even more preferably 15 mass % to 30 mass %. By the content of the organic solvent being within the range described above, it is possible to decrease the viscosity.

Surfactant

The surfactant is not particularly limited; however, for example, at least any of an acetylene glycol-based surfactant, a fluorine-based surfactant, and a silicone-based surfactant is preferable.

The acetylene glycol-based surfactant is not particularly limited; however, for example, one or more types selected from alkylene oxide adducts of 2,4,7,9-tetramethyl-5-decyne-4,7-diol and 2,4,7,9-tetramethyl-5-decyne-4,7-diol and alkylene oxide adducts of 2-4-dimethyl-5-decyne-4-ol and 2-4-dimethyl-5-decyne-4-ol are preferable. Commercial products of the acetylene glycol-based surfactant are not particularly limited; however, examples thereof include Olfine 104 series or E series such as Olfine E1010 (product name, manufactured by Air Products Japan, Inc.), Surfynol 465 or Surfynol 61 (product name, manufactured by Nissin Chemical Industry Co., Ltd.), and the like. The acetylene glycol-based surfactant may be used as one type individually or may be used in a combination of two or more types.

The fluorine-based surfactant is not particularly limited; however, examples thereof include perfluoroalkyl sulphonate, perfluoroalkyl carboxylate salt, perfluoroalkyl phosphoric acid ester, a perfluoroalkyl ethylene oxide adduct, perfluoroalkyl betaine, and a perfluoroalkyl amine oxide compound. Commercial products of the fluorine-based surfactant are not particularly limited; however, examples thereof include S-144 and S-145 (manufactured by Asahi Glass Co., Ltd.); FC-170C, FC-430, and Fluorad-FC4430 (manufactured by 3M Japan Ltd.); FSO, FSO-100, FSN, FSN-100, and FS-300 (manufactured by Dupont Corp.); FT-250 and 251 (manufactured by Neos Co., Ltd.), and the like. The fluorine-based surfactant may be used as one type individually or may be used in a combination of two or more types.

Examples of the silicon-based surfactant include a polysiloxane-based compound, a polyether-modified organosiloxane, and the like. Commercial products of the silicon-based surfactant are not particularly limited; however, specific examples thereof include BYK-306, BYK-307, BYK-333, BYK-341, BYK-345, BYK-346, BYK-347, BYK-348, and BYK-349 (the above are product names, manufactured by BYK Japan K.K.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (the above are product names, manufactured by Shin-Etsu Chemical Co., Ltd.), and the like.

The content of the surfactant is preferably 0.10 mass % to 5.0 mass % with respect to the total amount of the reaction solution and more preferably 0.10 mass % to 3.0 mass %. By the content of the surfactant being within the range described above, there is a tendency for the wettability of the reaction solution which is attached to the recording medium to be further improved.

Color Ink Composition

In a case of attaching a color ink composition individually to a recording medium with a glossiness at 60° of 80 to 100, the color ink composition produces recorded matter with a glossiness at 60° of 60 to 100, preferably produces recorded matter with a glossiness at 60° of 75 to 100, and more preferably produces recorded matter with a glossiness at 60° of 75 to 95. That is, with the ink composition, the glossiness is not comparatively deteriorated. By using the color ink composition, the OD is further improved in the recording medium with a glossiness at 60° of 10 or more and the OD is also further improved in the recording medium with a glossiness at 60° of less than 10. It is possible to control the glossiness at 60° in the recorded matter by adjusting the type, content, particle diameter, or the like of the coloring material, using two or more types of coloring materials or resin fine particles of different types and/or with different particle diameters from each other, or adjusting the type and content of the resin. In particular, it is preferable to obtain the glossiness described above by adjusting the particle diameter of the pigment as the coloring material. Here, it is possible to measure the glossiness at 60° using the methods described in the Examples.

The glossiness at 60° of the recording medium, which is a specification of the color ink composition, is 80 to 100, preferably 80 to 90, more preferably 80 to 85, and even more preferably 84. The recorded matter which is obtained by attaching the color ink composition individually to a recording medium where the glossiness at 60° is in the range described above refers to the glossiness of a pattern in a case of forming a pattern with an attachment amount such that the patterned portion of the recording medium is completely filled with the color ink composition (for example, by coating the ink at 7 mg/inch$^2$ with a resolution of 720×720 dpi).

Average Particle Diameter

The average particle diameter of the color ink composition according to a dynamic light scattering method is preferably 80 nm or more, more preferably 80 nm to 120 nm, and more preferably 80 nm to 110 nm. By the average particle diameter of the color ink composition according to a dynamic light scattering method being 80 nm or more, there is a tendency for the glossiness of the obtained recorded matter to be further improved in the recording medium with a glossiness at 60° of less than 10. In addition, by the average particle diameter of the color ink composition according to a dynamic light scattering method being 120 nm or less, there is a tendency for the glossiness of the obtained recorded matter to be further improved in the recording medium with a glossiness at 60° of 10 or more. The "average particle diameter" is a value which is obtained by (d50) in cumulative distribution and a volume average particle diameter in the invention. It is possible to measure the particle diameter using the methods described in the Examples. Here, the particle diameter is obtained by measuring the ink composition and pigments, resin fine particles, and the like may be included as the particles. The particle diameter may be adjusted by mixing two or more fine particles which have different particle diameters from each other.

There is a tendency for the glossiness to be improved when the volume average particle diameter of the pigment which is used for the ink composition is small; however, in a case of being used with an absorptive recording medium, there is a tendency to be easily absorbed and for the color development to deteriorate. In addition, in contrast, the larger the volume average particle diameter, the greater the tendency not to be easily absorbed in the absorptive recording medium and for the color development to be improved; however, there is a tendency for the glossiness to deteriorate. With respect to this, with an ink composition which has a comparatively broad particle diameter distribution, the balance of both is appropriately preserved. That is, both the glossiness and the color development may be improved.

Coloring Material

The coloring material is not particularly limited; however, examples thereof include pigments and dyes.

Pigment

The black pigment which is used for a black ink is not particularly limited; however, examples thereof include No. 2300, No. 900, MCF88, No. 33, No. 40, No. 45, No. 52, MA7, MA8, MA100, No. 2200B, and the like (the above are manufactured by Mitsubishi Chemical Corp.); Raven 5750, Raven 5250, Raven 5000, Raven 3500, Raven 1255, Raven 700, and the like (the above are manufactured by Carbon Columbia Corp.); Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (manufactured by CABOT JAPAN K.K.); and Color Black FW1, Color Black FW2, Color Black FW2V, Color Black FW18, Color Black FW200, Color Black 5150, Color Black 5160, Color Black S 170, Printex 35, Printex U, Printex V, Printex 140U, Special Black 6, Special Black 5, Special Black 4A, and Special Black 4 (the above manufactured by Degussa Corp.).

The pigment which is used for a white ink is not particularly limited; however, examples thereof include white inorganic pigments of C.I. Pigment White 6, 18, and 21, titanium oxide, zinc oxide, zinc sulfide, antimony oxide, and zirconium oxide. It is also possible to use a white organic pigment such as white hollow resin particles and polymer particles apart from the white inorganic pigment.

The pigment which is used for a yellow ink is not particularly limited; however, examples thereof include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

The pigment which is used for a magenta ink is not particularly limited; however, examples thereof include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245; or C.I. Pigment Violet 19, 23, 32, 33, 36, 38, 43, and 50.

The pigment which is used for a cyan ink is not particularly limited; however, examples thereof include C.I. Pigment Blue 1, 2, 3, 15, 15:1, 15:2, 15:3, 15:34, 15:4, 16, 18, 22, 25, 60, 65, and 66 and C.I. Vat Blue 4 and 60.

In addition, the pigments which are used for color inks apart from magenta, cyan, and yellow are not particularly limited; however, examples thereof include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

Among these, the color ink composition is preferably a black ink composition which contains a black pigment. Since the degree of decrease in the optical density of the recorded matter which is obtained using the black ink composition is typically large, the invention is particularly advantageous.

The content in a case where the coloring material is a pigment is preferably 0.50 mass % to 7.0 mass % with respect to the total amount of the ink composition, more preferably 1.0 mass % to 5.0 mass %, and more preferably 1.0 mass % to 4.0 mass %. By the content of the pigment being 0.50 mass % or more, there is a tendency for the OD to be further improved. In addition, by the content of the pigment being 7.0 mass % or less, there is a tendency for the ink clogging reliability to be further improved.

Dye

It is possible to use dyes as the coloring material. It is possible to use acid dyes, direct dyes, reactive dyes, and basic dyes as the dye without being particularly limited. Examples of the dyes include C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The dyes may be used as one type individually or may be used in a combination of two or more types.

Resin Fine Particles

The color ink composition may include resin fine particles. Since, by using the resin fine particles, the pigment is fixed to the recording medium by the resins fusing with each other and the resins and the pigment fusing with each other, it is possible to make the scratch resistance and the adhesion of the image portion of the recorded matter more favorable. Among resin fine particles, a urethane-based resin, an acryl-based resin, and a polyethylene-based resin are preferable.

Examples of the urethane-based resin include a urethane resin emulsion. The urethane resin emulsion is not particularly limited as long as the urethane resin emulsion is a resin emulsion which has a urethane bond in the molecule and examples thereof include a polyether type urethane resin which includes an ether bond in the main chain, a polyester type urethane resin which includes an ester bond in the main chain, and a polycarbonate type urethane resin which includes a carbonate bond in the main chain. Commercial products of the urethane resin emulsion described above are not particularly limited; however, examples thereof include Sancure 2710 (a product name manufactured by The Lubrizol Corp.), Permarin UA-150 (a product name manufactured by Sanyo Chemical Industries, Ltd.), Superflex 460, 470, 610, and 700 (product names manufactured by Dai-ichi Kogyo Seiyaku Co., Ltd.), NeoRez R-9660, R-9637, and R-940 (product names manufactured by Kusumono Chemicals Ltd.), Adeka BONTIGHTER HUX-380 and 290K (product names manufactured by Adeka Corp.), and Takerack (a registered trademark) W-605, W-635, and WS-6021 (the above are product names, Mitsui Chemicals, Inc.), Polyether (Taisei Finechemical Co., Ltd., product name, Tg=20° C.)

Examples of the acryl-based resin include an acryl resin emulsion. The acryl resin emulsion is not particularly limited; however, examples thereof include an emulsion where (meth)acryl-based monomers such as (meth)acrylic acid and (meth)acrylic acid ester are polymerized, or an emulsion where (meth)acryl-based monomers and other monomers are copolymerized. Commercial products of the acryl resin fine particles are not particularly limited; however, examples thereof include Mowinyl 966A (product name manufactured by Nippon Synthetic Chemical Industry Co., Ltd.), Microgel E-1002 and Microgel E-5002 (the above are product names, manufactured by Nippon Paint Co., Ltd.), Bonkote 4001 and Bonkote 5454 (the above are product names, manufactured by DIC Corp.), SAE 1014 (a product name, manufactured by Zeon Corp.), Saibinorl SK-200 (product name, manufactured by Saiden Chemical Industry Co., Ltd.), Joncryl 7100, Joncryl 390, Joncryl 711, Joncryl 511, Joncryl 7001, Joncryl 632, Joncryl 741, Joncryl 450, Joncryl 840, Joncryl 62J, Joncryl 74J, Joncryl HRC-1645J, Joncryl 734, Joncryl 852, Joncryl 7600, Joncryl 775, Joncryl 537J, Joncryl 1535, Joncryl PDX-7630A, Joncryl 352J, Joncryl 352D, Joncryl PDX-7145, Joncryl 538J, Joncryl 7640, Joncryl 7641, Joncryl 631, Joncryl 790, Joncryl 780, and Joncryl 7610 (the above are product names, manufactured by BASF Corp.), and NK Binder R-5HN (product name manufactured by Shin-Nakamura Chemical Co., Ltd., solid content 44%).

The polyethylene-based resin is not particularly limited; however, examples thereof include polyethylene-based resins (for example, a product named "Chemipearl 5650" manufactured by Mitsui Chemicals, Inc.) and polyethylene-based resins (for example, a product named "AQ515" manufactured by BYK Japan K.K.).

Among these, at least one type selected from a group formed of a (meth)acryl-based resin and a styrene-(meth) acrylic acid copolymer-based resin is preferable, at least one type selected from a group formed of an acryl-based resin and a styrene-acrylic acid copolymer-based resin is more preferable, and a styrene-acrylic acid copolymer-based resin is even more preferable. Here, the copolymers described above may take any form out of a random copolymer, a block copolymer, an alternating copolymer, and a graft copolymer.

The resin fine particles may be used as one type individually or may be used in a combination of two or more types. The content of the resin fine particles is preferably 0.50 mass % to 10 mass % with respect to the total amount of the ink composition, more preferably 0.50 mass % to 7.0 mass %, even more preferably 0.50 mass % to 5.0 mass %, and even more preferably 0.50 mass % to 3.0 mass %. By the content of the resin fine particles being within the range described above, there is a tendency for the water resistance and the scratch resistance of the recorded matter to be superior and, additionally, there is a tendency for the long-term preservation stability of the ink composition to be excellent and for it to be possible to decrease the viscosity of the ink composition in particular.

Water

It is possible to use, for example, the examples of water given for the reaction solution composition as water. The content of the water is preferably 50 mass % to 80 mass % with respect to the total amount of the first color ink composition, more preferably 55 mass % to 75 mass %, and even more preferably 60 mass % to 70 mass %.

Organic Solvent

In addition, the first color ink composition may include an organic solvent. The organic solvent is not particularly limited; however, it is possible to use the examples of organic solvents given in the reaction solution composition. The content of the organic solvent is preferably 5.0 mass % to 30 mass % with respect to the total amount of the first color ink composition, more preferably 7.5 mass % to 25 mass %, and even more preferably 10 mass % to 25 mass %. By the content of the organic solvent being within the range described above, there are advantages in that the attachment is easily carried out using the ink jet method, the wetting extendability of the ink composition to the recording medium is good, and the like.

Surfactant

In addition, the first color ink composition may include a surfactant. The surfactant is not particularly limited; however, it is possible to use the examples of surfactants given in the reaction solution composition. The content of the surfactant is preferably 0.10 mass % to 5.0 mass % with respect to the total amount of the first color ink composition and more preferably 0.10 mass % to 3.0 mass %. By the content of the surfactant being within the range described above, there is a tendency for the wettability of the first color ink composition which is attached to the recording medium to be further improved.

Other Components

It is also possible to appropriately add various types of additive agents such as a dissolution assisting agent, a viscosity adjusting agent, a pH adjusting agent, an antioxidant, a preservative, an antifungal agent, a corrosion inhibitor, and a chelating agent for catching metal ions which influence the dispersion to the first color ink composition in order to favorably maintain the preservation stability and the discharge stability from a head, to improve clogging, or to prevent deterioration of the ink composition.

Recording Apparatus

Next, description will be given of a recording apparatus which may be used for the recording method of the present embodiment. The recording apparatus of the present embodiment performs recording using the recording method described above. FIG. 1 is a side surface diagram which shows a schematic of the entirety of an example of an ink jet recording apparatus 1 which may be used in the present embodiment. As shown in FIG. 1, the ink jet recording apparatus 1 is provided with a feeding section 10 for the recording medium, a transport section 20, a recording section 30, a drying section 90, and a discharge section 70.

Out of these, the drying section 90 has a first drying section 40 which dries a reaction solution, and a second drying section 50 which dries the recorded matter which is obtained using the recording method according to the present embodiment.

In addition, the feeding section 10 is provided so as to be able to feed a recording medium F in a roll form to the transport section 20. In detail, the feeding section 10 has a roll medium holder 11 and the roll medium holder 11 holds the recording medium F in roll form. Then, the configuration is set to be able to feed the recording medium F to the transport section 20 on the downstream side in the sending direction Y by rotating the recording medium F in roll form.

Furthermore, the transport section 20 is provided so as to be able to transport the recording medium F, which is sent from the feeding section 10, to the recording section 30. In detail, the transport section 20 has a first sending roller 21 and is configured so as to be able to transport the sent recording medium F to the recording section 30 further to the downstream side in the sending direction Y.

In addition, the recording section 30 is provided so as to be able to carry out recording by discharging the ink composition by coating the reaction solution with respect to the recording medium F which is sent from the transport section 20. In detail, the recording section 30 is provided with heads 31 and 32 which perform a reaction solution attaching step, a recording head 33 which performs an ink composition attaching step, and a platen 34 as a medium-supporting section.

Out of these, the platen 34 is provided so as to be able to support the recording medium F from the rear surface. In addition, the platen 34 is provided with the first drying section 40 which dries the reaction solution which is attached to the recording medium F and the ink composition which is attached to the recording medium F. Furthermore, a second sending roller 43 is provided on the downstream side from the platen 34 in the sending direction Y. Then, the second sending roller 43 is configured so as to be able to send the recorded recording medium F to the second drying section 50 which is on the downstream side in the sending direction Y.

In addition, the second drying section 50 is configured so as to be able to further dry the reaction solution which is attached to the recording medium F and the ink composition which is attached to the recording medium F. Furthermore, a third sending roller 65 is provided in the vicinity of an outlet 64 of the second drying section 50. The third sending roller 65 is arranged so as to come into contact with the rear surface of the recording medium F and is configured so as to be able to send the recording medium F to the discharge section 70 which is on the downstream side in the sending direction Y.

Furthermore, the discharge section 70 is provided so as to be able to send the recording medium F which is sent from the second drying section 50 further to the downstream side in the sending direction Y and discharge the recording medium F to the outside of the ink jet recording apparatus 1. In detail, the discharge section 70 has a fourth sending roller 71, a fifth sending roller 72, a sixth sending roller 73, a seventh sending roller 74, and a winding roller 75. Out of these, the fourth sending roller 71 and the fifth sending roller 72 are arranged so as to come into contact with the front surface of the recording medium F. In addition, the sixth sending roller 73 and the seventh sending roller 74 are arranged so as to form a pair of rollers. Then, the recording medium F which is discharged by the sixth sending roller 73 and the seventh sending roller 74 is provided so as to be wound by the winding roller 75. The recording method of the present embodiment is preferably performed using a recording apparatus which is able to execute the first recording and the second recording described above. In addition, a step of selecting at least one of the first recording and the second recording may be provided and the selected recording may be performed. The selection of the recording may be performed according to an instruction from a user, the type of the recording medium on which recording is to be performed, the type of an image to be recorded, the recording conditions, and the like. In addition, the recording method may perform both the first recording and the second recording. In this case, the first recording and the second recording may be continuously or intermittently performed to two or more recording media in order, or the first recording and the second recording may be performed on one recording medium. In the latter case, recording media in which regions with different glossiness are provided in one recording medium may be used. These cases are preferable in that it is possible to select and perform the recording from the first recording and the second recording.

Ink Set

An ink set of the present embodiment is provided with a color ink composition which contains a coloring material, and a reaction solution which includes an aggregating agent which aggregates components of the color ink composition, in which the color ink composition produces recorded matter with a glossiness at 60° of 60 to 100 when attaching the color ink composition individually to a recording medium with a glossiness at 60° of 80 to 100.

As the reaction solution and the color ink composition, it is possible to use appropriate combinations of the reaction solution and the color ink composition described above.

The ink set of the present embodiment may further have a clear ink.

EXAMPLES

Detailed description will be given below of the invention using Examples and Comparative Examples. The invention is not limited by the examples below.

Materials for Color Ink Composition

The main materials for the ink composition which were used in the Examples and Comparative Examples described below are as follows.

Aggregating Agent
Calcium nitrate·4 hydrate
Calcium acetate·1 hydrate
Succinic acid
Coloring Material
Carbon Black 1 (volume average particle diameter of 40 nm)
Carbon Black 2 (volume average particle diameter of 120 nm)
Surfactant
Silicon-based surfactant (manufactured by BYK Japan K.K., product name BYK 348)
Resin Fine Particles
Acryl styrene-based resin (manufactured by BASF Corp. "Joncryl 62J")
Solvent
1,2-hexane diol
Propylene glycol Preparation of Ink Composition Each composition was obtained by mixing and sufficiently stirring each material in the compositions shown in Table 1 below. In detail, each composition was prepared by uniformly mixing each material and removing insoluble matter with a filter. Here, in Table 1 below, the unit of the numeric values is mass % and the total is 100.0 mass %.

Particle Diameter

With regard to the average particle diameter (d50) of the particles which are included in the ink composition, samples were prepared by diluting the ink composition 100-fold using water, and, using these samples, the volume average particle diameters were measured using a dynamic light scattering method with a Nanotrac particle size analyzer UPA-EX 150 (manufactured by Nikkiso Co., Ltd.).

Individual Glossiness of Color Ink Composition

Recorded matter was obtained by forming a pattern by respectively attaching obtained Bk ink with an attachment amount of 7 mg/inch$^2$ at a recording resolution of 720×720 dpi with respect to coated paper B (60° glossiness=84, product name "Elitelcast 73", manufactured by Daio Paper Corp.). The glossiness of the obtained recorded matter was measured using a glossiness measuring device: GM-268 Plus (manufactured by Konica Minolta, Inc.). The results thereof will be shown below.

Bk1; Bk with a glossiness at 60° of 110 on coated paper B before using the reaction solution
Bk2; Bk with a glossiness at 60° of 100 on coated paper B before using the reaction solution
Bk3; Bk with a glossiness at 60° of 77 on coated paper B before using the reaction solution
Bk4; Bk with a glossiness at 60° of 62 on coated paper B before using the reaction solution
Bk5; Bk with a glossiness at 60° of 45 on coated paper B before using the reaction solution With regard to the determination in Table 2, X is set when the evaluation is rank C and O is set when the evaluation is not rank C.

TABLE 1

| Composition No. | | Reaction Solution | | | Black Ink | | | | | Clear Ink |
|---|---|---|---|---|---|---|---|---|---|---|
| | | H1 | H2 | H3 | Bk1 | Bk2 | Bk3 | Bk4 | Bk5 | CL |
| Aggregating Agent | Calcium nitrate•4 hydrate | 19 | 0 | 0 | 0 | 0 | 0 | 0 | 0 | 0 |
| | Calcium acetate•1 hydrate | 0 | 15 | 0 | 0 | 0 | 0 | 0 | 0 | 0 |
| | Succinic acid | 0 | 0 | 4.5 | 0 | 0 | 0 | 0 | 0 | 0 |
| Coloring Material | Carbon Black 1 | 0 | 0 | 0 | 4 | 3 | 2 | 1 | 0 | 0 |
| | Carbon Black 2 | 0 | 0 | 0 | 0 | 1 | 2 | 3 | 4 | 0 |
| Surfactant | Silicon-based surfactant | 0.6 | 0.6 | 0.6 | 0.6 | 0.6 | 0.6 | 0.6 | 0.6 | 0.6 |
| Aggregable Resin | Acryl styrene-based resin | 0 | 0 | 0 | 1 | 1 | 1 | 1 | 1 | 5 |
| Organic Solvent | 1,2-hexanediol | 3 | 3 | 3 | 3 | 3 | 3 | 3 | 3 | 3 |
| | Propylene glycol | 15 | 15 | 15 | 10 | 10 | 10 | 10 | 10 | 10 |
| Water | | Remainder | Remainder | Remainder | Remainder | Remainder | Remainder | Remainder | Remainder | Remainder |
| Total | | 100 | 100 | 100 | 100 | 100 | 100 | 100 | 100 | 100 |
| Aggregating Agent Concentration (mol/1000 g) | | 0.805 | 0.851 | 0.381 | — | — | — | — | — | — |
| Color Ink Average Particle Diameter | | — | — | — | 60 | 85 | 110 | 120 | 130 | — |

TABLE 2

| | | Example 1 | Example 2 | Example 3 | Example 4 | Example 5 | Example 6 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|---|
| Reaction Solution | | H1 | H1 | H1 | H1 | H2 | H3 | H1 | H1 | Not present | Not present | Not present | Not present |
| Black Ink | | Bk2 | Bk3 | Bk4 | Bk3 | Bk3 | Bk3 | Bk1 | Bk5 | Bk3 | Bk3 | Bk1 | Bk5 |
| Clear Ink | | Not present | Not present | Not present | Present | Not present | Not present | Not present | Not present | Not present | Present | Not present | Not present |
| Glossiness (No reaction solution) | Coated paper B | 100 | 77 | 65 | 77 | 77 | 77 | 110 | 45 | 77 | 77 | 110 | 45 |
| OD | High quality paper | B | A | A | A | A | B | C | AA | C | C | C | C |
| | Coated paper A | A | B | B | A | B | A | A | C | A | AA | AA | B |
| | Coated paper B | AA | A | B | AA | A | A | AA | C | AA | AA | AA | B |
| | Film | A | A | B | AA | A | A | AA | C | AA | AA | AA | B |
| Evaluation | | o | o | o | o | o | o | x | x | x | x | x | x |

Examples 1 to 6 and Comparative Examples 1 to 6

The recording medium was introduced into a PX-G930 and a reaction solution filled in the head was ink jet coated thereon with an attachment amount of 1.7 mg/inch² at a resolution of 720×720 dpi. Next, recorded matter was obtained by ink jet coating the black ink filled in the head to the surface where the reaction solution is attached with an attachment amount of 7 mg/inch² at a resolution of 720×720 dpi. Here, in Example 4 and Comparative Example 4, the clear ink filled in the head was ink jet coated on the surface where the ink composition is attached with an attachment amount of 2 mg/inch² at a resolution of 720×720 dpi. Adjustment was carried out such that the recording medium surface temperature was 25° C. during the recording described above. In addition, after the recording, drying was carried out at 60° C. for 10 minutes after discharging the recorded matter from the printer.

The used recording media will be listed below.
High quality paper (product name "55PW8R", manufactured by Lintec Corp.: 60° glossiness=5)
Coated paper A (product name "NP Coat PW8E", manufactured by Lintec Corp.: 60° glossiness=16)
Coated paper B (product name "Elitelcast 73", manufactured by Daio Paper Corp.: 60° glossiness=84)
Film (product name "PET50(A)PAT19K", manufactured by Lintec Corp.: 60° glossiness=99)

In addition, the optical density (the OD value) of the obtained recorded matter was measured using an OD measuring device: Spectrolino (manufactured by GretagMacbeth Corp.) and evaluation was carried out using the evaluation criteria described below according to the recording medium.
Evaluation Contents
OD (High quality paper)
AA: 1.5 or more
A: 1.4 or more to less than 1.5
B: 1.3 or more to less than 1.4
C: less than 1.3
OD (coated paper and film)
AA: 2.0 or more
A: 1.9 or more to less than 2.0
B: 1.8 or more to less than 1.9
C: less than 1.8

In Comparative Examples 1 and 5 (color ink Bk1) where the glossiness at 60° is 110 in a case of attaching the color ink composition individually to the recording medium, it is understood that it is not easy to obtain color development since the permeation into an absorptive recording medium occurs easily and that the OD value becomes high since there is a tendency for the glossiness of an ink coated film to be comparatively high in a non-absorptive or a low-absorptive recording medium. In contrast, for the color inks Bk2 to Bk4, the color development is good due to there being little permeability into an absorptive recording medium and the OD value is high since there is a tendency for the glossiness of the ink coated film to be high in a non-absorptive and low-absorptive recording medium.

In addition, in Comparative Examples 2 and 6 (color ink Bk5) where the glossiness at 60° is 45 in a case of attaching the color ink composition individually to the recording medium, it is understood that, although the permeation is comparatively little and the color development is good even in an absorptive recording medium, the OD value is lowered since there is a tendency for the glossiness of the ink coated film to be comparatively low in non-absorptive and low-absorptive recording media.

Furthermore, in Comparative Examples 3 and 4 in which the reaction solution was not used, it is understood that the OD decreases in a case of using high quality paper.

The entire disclosure of Japanese Patent Application No.:2014-191884, filed Sep. 19, 2014 is expressly incorporated by reference herein.

What is claimed is:

1. A recording method comprising:
    recording which includes
    attaching a color ink composition which contains a coloring material to a recording medium and
    attaching a reaction solution which includes an aggregating agent which aggregates components of the color ink composition,
    wherein the color ink composition gives recorded matter with a glossiness at 60° of 60 to 100 when the color ink composition is individually attached to the recording medium with a glossiness at 60° of 80 to 100, and
    wherein, using a recording apparatus which is able to perform first recording which performs recording on a recording medium with a glossiness at 60° of less than 10 and second recording which performs recording on a recording medium with a glossiness at 60° of 10 or more, the recording selects at least one recording, and performs the selected recording.

2. The recording method according to claim 1,
    wherein, when attaching the color ink composition individually to the recording medium with a glossiness of 80 to 100 at 60°, the color ink composition gives recorded matter with a glossiness at 60° of 75 to 100.

3. A recording apparatus which performs recording using the recording method according to claim 2.

4. The recording method according to claim 1,
    wherein recording is performed on a recording medium with a glossiness at 60° of 50 or more in the second recording.

5. A recording apparatus which performs recording using the recording method according to claim 4.

6. The recording method according to claim 1,
    wherein the color ink composition contains 0.50 mass % to 7.0 mass % of a pigment and 0.05 mass % to 10 mass % of resin fine particles.

7. A recording apparatus which performs recording using the recording method according to claim 6.

8. The recording method according to claim 1,
    wherein the color ink composition is a black ink composition which contains a black pigment.

9. A recording apparatus which performs recording using the recording method according to claim 8.

10. The recording method according to claim 1,
    wherein the recording medium with a glossiness at 60° of less than 10 is an absorptive recording medium, and
    the recording medium with a glossiness at 60° of 10 or more is a low-absorptive recording medium or non-absorptive recording medium.

11. A recording apparatus which performs recording using the recording method according to claim 10.

12. The recording method according to claim 1,
    wherein the aggregating agent includes at least one of a multivalent metal salt and an organic acid.

13. A recording apparatus which performs recording using the recording method according to claim 12.

14. The recording method according to claim 1,
    wherein an average particle diameter of the color ink composition according to a dynamic light scattering method is 80 nm or more.

15. A recording apparatus which performs recording using the recording method according to claim 14.

16. A recording apparatus which performs recording using the recording method according to claim 1.

17. An ink set comprising:
- a color ink composition which contains a coloring material; and
- a reaction solution which includes an aggregating agent which aggregates components of the color ink composition,
- wherein the color ink composition gives recorded matter with a glossiness at 60° of 60 to 100 when the color ink composition is individually attached to a recording medium with a glossiness at 60° of 80 to 100, and
- wherein the glossiness at 60° of the recording medium which is used in a first recording is less than 10, and the glossiness at 60° of the recording medium which is used in a second recording is 10 or more.

\* \* \* \* \*